US009548008B1

(12) United States Patent
Manning

(10) Patent No.: US 9,548,008 B1
(45) Date of Patent: Jan. 17, 2017

(54) MODULAR SIGNAGE SYSTEMS, ASSEMBLIES, COMPONENTS, AND METHODS

(71) Applicant: Joshua Manning, Rock Hill, SC (US)

(72) Inventor: Joshua Manning, Rock Hill, SC (US)

( * ) Notice: Subject to any disclaimer, the term of this patent is extended or adjusted under 35 U.S.C. 154(b) by 0 days.

(21) Appl. No.: 15/076,567

(22) Filed: Mar. 21, 2016

Related U.S. Application Data

(60) Provisional application No. 62/135,341, filed on Mar. 19, 2015.

(51) Int. Cl.
| | | |
|---|---|---|
| *G09F 9/302* | (2006.01) | |
| *G09F 13/22* | (2006.01) | |
| *H02J 7/02* | (2016.01) | |
| *F21V 23/02* | (2006.01) | |
| *F21V 23/06* | (2006.01) | |
| *F21V 17/10* | (2006.01) | |
| *F21S 9/02* | (2006.01) | |
| *F21Y 101/02* | (2006.01) | |
| *F21Y 113/00* | (2016.01) | |

(52) U.S. Cl.
CPC .................. *G09F 9/302* (2013.01); *F21S 9/02* (2013.01); *F21V 17/105* (2013.01); *F21V 23/02* (2013.01); *F21V 23/06* (2013.01); *G09F 13/22* (2013.01); *H02J 7/025* (2013.01); *H02J 50/12* (2016.02); *F21Y 2101/02* (2013.01); *F21Y 2113/005* (2013.01); *G09F 2013/222* (2013.01)

(58) Field of Classification Search
CPC .. G09F 9/302; G09F 13/0404; G09F 15/0068; F21V 17/105; H02J 50/12
See application file for complete search history.

(56) References Cited

U.S. PATENT DOCUMENTS

| 767,060 | A | | 8/1904 | Joseph | |
|---|---|---|---|---|---|
| 873,921 | A | * | 12/1907 | Chester | ............... G09F 13/0404 40/552 |
| 881,390 | A | | 3/1908 | James | |
| 928,309 | A | | 7/1909 | Charles | |
| 1,122,164 | A | * | 12/1914 | Schneider | ........... G09F 13/0404 40/552 |
| 1,251,471 | A | * | 1/1918 | Brooks | ................... G09F 13/00 40/551 |

(Continued)

*Primary Examiner* — Gary Hoge
(74) *Attorney, Agent, or Firm* — Fantastic IP Consulting; Eduardo E. Drake

(57) ABSTRACT

The present inventor devised, among other things, one or more exemplary systems, kits, methods, devices, assemblies, components, and/or software and related graphical interfaces related to signs with interchangeable illumination elements. One exemplary embodiment includes an illuminated sign assembly of two or more alphanumeric lighting elements formed of a transparent or translucent injection- or blow-molded plastic and including a number of surface-mounted light-emitting diodes (LEDs). Each of the alphanumeric elements plugs into power track, and can be independently rotated to a desired orientation relative the power track. In some embodiments, the each of the elements can be wireless controlled or programmed via a smartphone to blink or change colors according to a desired pattern or in response to ambient conditions. In still other embodiments, the lighting elements vertically stack onto a recharge station, and in yet others the elements are powered or recharged via resonant inductive coupling.

24 Claims, 5 Drawing Sheets

(56) References Cited

U.S. PATENT DOCUMENTS

| | | | |
|---|---|---|---|
| 2,895,245 A | | 7/1959 | Spangler |
| 3,221,432 A | * | 12/1965 | Gold .................... G09F 13/0404 |
| | | | 40/551 |
| 3,404,475 A | * | 10/1968 | Coad ....................... G09F 7/002 |
| | | | 40/552 |
| 3,447,253 A | * | 6/1969 | Coad ....................... F21V 21/08 |
| | | | 40/552 |
| 3,553,870 A | * | 1/1971 | Rudolph ............. G09F 13/0404 |
| | | | 40/576 |
| 4,769,749 A | | 9/1988 | Felski |
| 4,951,405 A | * | 8/1990 | Sabala .................... G09F 13/28 |
| | | | 40/545 |
| 5,624,181 A | | 4/1997 | Miller et al. |
| 5,683,172 A | | 11/1997 | Huag |
| 5,709,462 A | | 1/1998 | Rumpel |
| 6,170,964 B1 | | 1/2001 | Hsu |
| 6,226,908 B1 | | 5/2001 | Byers |
| 6,511,207 B2 | | 1/2003 | Limber et al. |
| 6,708,433 B1 | | 3/2004 | Falkner et al. |
| 7,131,748 B2 | | 11/2006 | Kazar et al. |
| 7,241,031 B2 | | 7/2007 | Sloan et al. |
| 7,513,644 B2 | | 4/2009 | Kufferath-Kassner et al. |
| 7,566,142 B2 | | 7/2009 | Wesson |
| 7,946,731 B1 | | 5/2011 | Wray |
| 2015/0199928 A1 | * | 7/2015 | Ector, Jr. ............. G09F 13/0413 |
| | | | 40/544 |

* cited by examiner

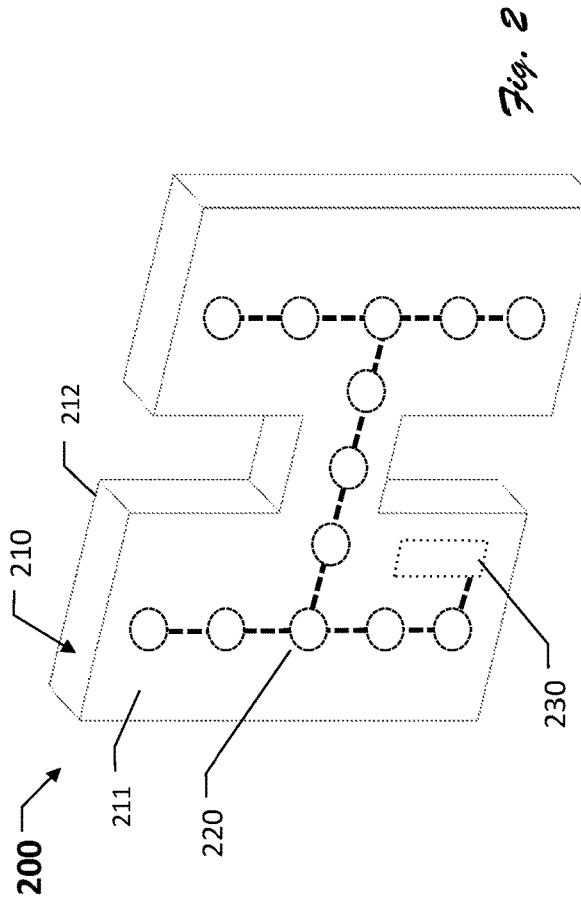
Fig. 2
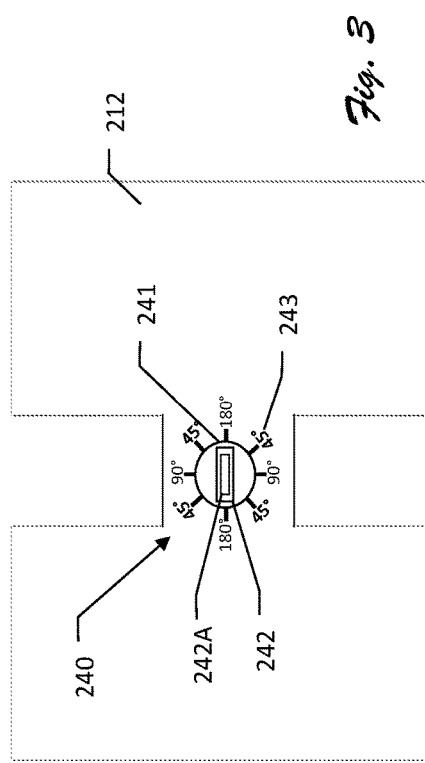
Fig. 3
Fig. 4

MODULAR SIGNAGE SYSTEMS, ASSEMBLIES, COMPONENTS, AND METHODS

RELATED APPLICATION

The present application claims priority to U.S. Provisional Patent Application 62/135,341 which was filed on Mar. 19, 2015, and which is incorporated herein by reference in its entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the patent and trademark office patent files or records, but otherwise reserves all copyrights whatsoever. The following notice applies to this document: Copyright © 2015, JOSHUA MANNING.

TECHNICAL FIELD

Various embodiments of the invention relate generally to illuminated signs, particularly illuminated signs with interchangeable elements.

BACKGROUND

The present inventor recognized that illuminated signs typically have fixed messages that are not easily changed or adapted. Moreover, those that can be changed are typically box light fixtures with flat textual or character panels that are not only uninspiring to view, but also cumbersome to change.

Accordingly, the present inventor has at least identified a need for a better way of displaying lit phrases easily.

SUMMARY

To address one or more of these and/or other needs or problems, the present inventor devised, among other things, one or more exemplary systems, kits, methods, devices, assemblies, components, and/or software and related graphical interfaces related to signs with interchangeable illumination elements.

In one exemplary embodiment, the invention takes the form of an illuminated sign system include a set of two or more 3-dimensional box symbol structures, for example alphanumeric characters, formed of a transparent or translucent injection- or blow-molded plastic. Each symbol includes two or more parallel or series connected LED (light emitting diode structures) that with wirelessly controllable electronic circuitry to effect color changes, blinking, chasing, and backward and forward moving effects. In some embodiments, control is provided via a standalone remote control unit or Bluetooth connection to smartphone having a specialized lighting control app. Power—AC electric or solar-charged battery—is provided through a common mounting rail structure that each letter magnetically fastens and plugs into. In other embodiments, a control box may be built onto the power rail or housed in or mounted on one of the letters. Each symbol in the exemplary embodiment includes a rotatable back mounting member that can be rotated to a desired angle relative to horizontal, facilitating angular alignment of all characters in a desired message. Some embodiment include hanging elements and ground stakes that clip or screw onto the power rail to allow for various display options.

The magnetic plug-and-play nature of the exemplary system is easy-to-use and highly versatile, as signage symbols can be plugged in and out of the power rail system in a matter of seconds.

BRIEF DESCRIPTION OF THE DRAWINGS

Various embodiments are described herein with reference to the following attached figures (Figs). These figures are annotated with reference numbers for various features and components, and these numbers are used in the following description as a teaching aid, with like numbers referring to the same or similar features and components.

FIG. 2 is a perspective view of a modular alphanumeric lighting element portion of the FIG. 1 assembly, corresponding to one or more embodiments of the present invention.

FIG. 3 is a back view of a modular alphanumeric lighting element portion of the FIG. 1 assembly, corresponding to one or more embodiments of the present invention.

FIG. 4 is a side view of a modular alphanumeric lighting element portion of the FIG. 1 assembly, corresponding to one or more embodiments of the present invention.

DESCRIPTION OF EXEMPLARY EMBODIMENT(S)

Figure 1:
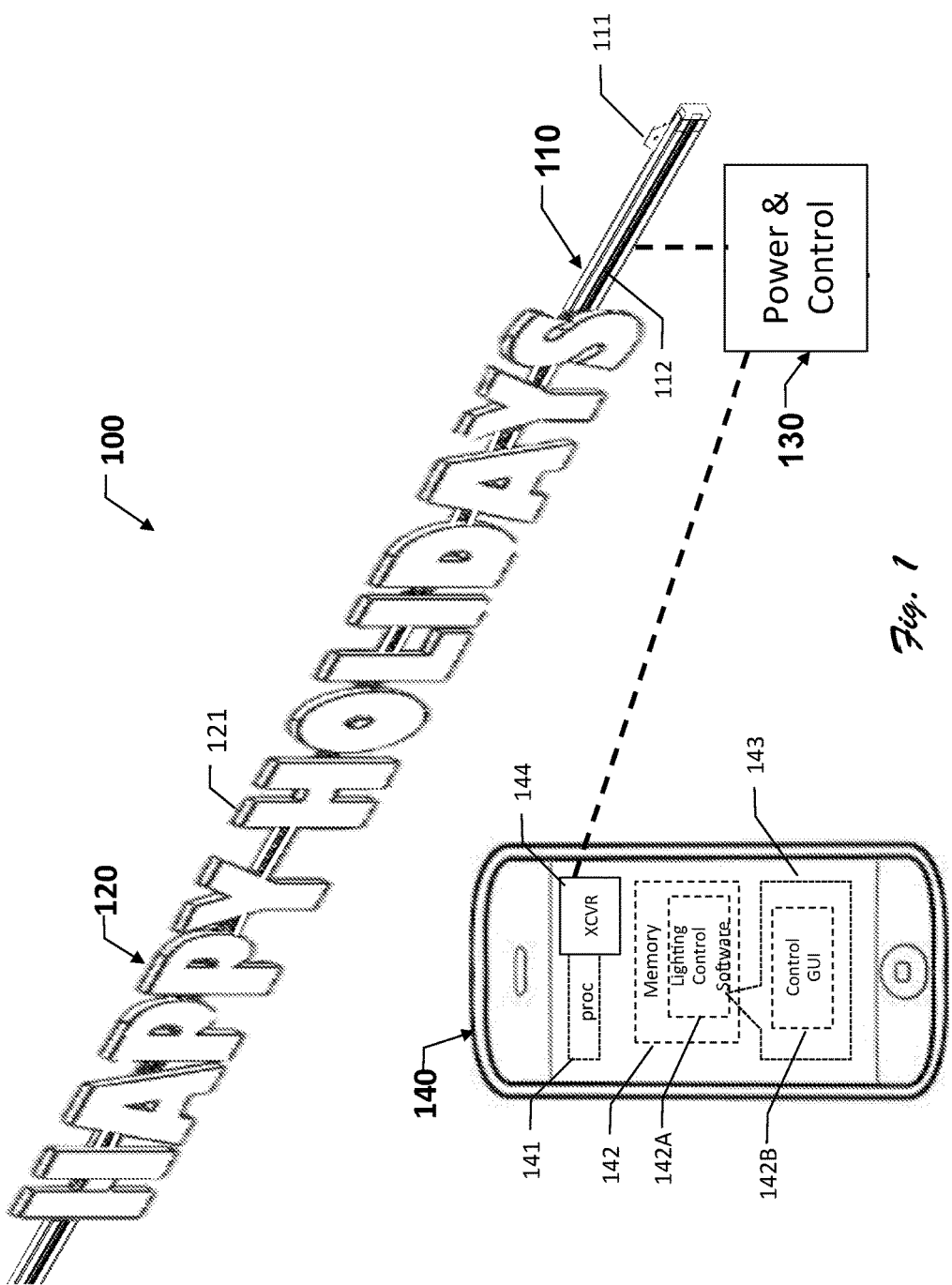
FIG. 1 is a perspective block diagrammatic view of an exemplary modular illuminated sign assembly 100, corresponding to one or more embodiments of the present invention.

This document, which incorporates drawings and claims, describes one or more specific embodiments of one or more inventions. These embodiments offered not to limit but only to exemplify and teach the invention, are shown and described in sufficient detail to enable those skilled in the art to implement or practice the invention(s). Thus, where appropriate to avoid obscuring the invention(s), the description may omit certain information known to those of skill in the art FIG. 1 shows an illuminated sign assembly 100. Assembly 100 includes a power mounting track 110, and set of one or more alphanumeric lighting elements or modules 120, a power and control module 130, and a smartphone control unit 140.

Power mounting track 110, which takes the exemplary form of a rigid metallic or plastic channel or C-beam, includes a mounting tab 111 and a front slot portion 112. Mounting tab 111, which is representative of a set of two or more tabs distributed along the length of the track, allow fastening of the track to a wall or other support structure via nails, screws, or other fasteners. Front slot portion 112 runs the full length of track 110 in some embodiments, and provides access to a positive and negative (neutral) conductors or contacts (no visible in this view.) The slot mechanically engages and supports each of the alphanumeric lighting elements 120 while also ensuring their electrical connection to the positive and negative conductors within it.

Alphanumeric lighting elements 120 include two or more three-dimensional translucent or transparent plastic molded numerals, letters, or other legible symbols, of which lighting element 121 is generally representative. (Some embodiments intermix or include non-alphanumeric lighting elements, such as sports and corporate logos, with alphanumeric lighting elements on the power mounting track.) Each of the lighting elements includes one or more electrical or electrochemical lights sources, for example monochromatic or multicolor light-emitting diodes (LEDs) which electrically connected to the positive and negative conductors within power mounting track 110. Lighting elements 120 may be sold in prepackaged kits to represent phrases or messages in various languages, such as English or Spanish, with each alphanumeric character of the message provided as a separate lighting element. Exemplary phrases include Happy Holidays, Merry Christmas, Happy New Year, Happy Birthday, Happy Anniversary, Congratulations, and Just Married. Some embodiments, as described more fully below, allow for oriented the each lighting element at a selected angle relative to the power mounting track. Also, some embodiments include switching and voltage regulation circuitry as known in the art for selectively blinking and changing the colors of the light sources according to a preprogrammed or dynamic or environmentally responsive pattern. Alphanumeric lighting elements 120 are connected via the conductors in the power mounting rail to Power source 130.

Power source 130 provides electric power to the alphanumeric lighting elements and may take a variety of forms. In one embodiment, power source 110 is an AC adapter that plugs into a standard 110 VAC outlet and outputs a DC voltage, for example 5 volts. In some embodiments, each of the lighting elements is provided with a separate rechargeable battery, and power source 130 is provided as a battery recharging station. In some embodiments, power source 130 includes a resonant inductive coupling circuitry, including a transmission coil, which is turned to wirelessly transmit power to matching resonant inductive coupling circuitry, including a receiver coil, within each of the light elements. The exemplary embodiment further includes a remote control unit in the form of smartphone 140 or other programmable device with a wireless communication capability.

Smartphone 140, for example an Apple iPhone or Samsung Galaxy or other Android mobile phone, includes a processor circuit 141 coupled to a memory module 142, a display 143, and an a transceiver 144. Memory module 142 includes native smart phone machine-executable instructions, as well as lighting control software 142A and an associated control graphical user interface (GUI) 142B, which upon execution of software 142A is rendered for users interaction on display 143. In some embodiments, GUI also includes voice and speech recognition. Selection of blinking and color change patterns via GUI 142B, results in processor circuit 141 sending control data and/or signals to lighting elements 120 via transceiver 144. In the exemplary embodiment, transceiver 144 takes the form of a Bluetooth compliant transceiver that is paired with a compatible transceiver in one or more of the lighting elements. Some embodiments may provide the transceiver in the light modules as a module separate from the lighting elements, allowing one module to control multiple lighting elements instead of providing each module with its own transceiver module. Also, in some embodiments, the smartphone may communicate blinking and/or color control signals in response to digital music stored or being played on the smartphone. In some embodiments, one or more of the lighting elements include a memory for storing digital music or audio generally, which can be played back through the lighting elements augmented with embedded speakers (or audio transducers.)

FIGS. 2, 3, and 4 show respective front, back, and side views of lighting element 121. Lighting element 121, representative of a capital H for example, includes a plastic housing 210, light sources 220, a power/control module 230, and a dial plug 240.

Housing 210 includes a transparent or translucent front surface 211 and an opposing back surface 212. Front surface 211 allows transmission of light from light sources 220, for example color changing LEDs, through the surface to human observers. Light sources 220 are powered and/or controlled via power/control module 230. Mounted on back surface 212 is dial plug 240. Dial plug 240 includes a dial structure 241 and dial markings 242. Dial structure 241, which includes a central rectangular magnetic plug structure 241A and a circular back plate 241B, rotate in unison about a central axis 244 extending through the plate and plug, generally perpendicular to a plane defined by surface 212, and lock into place via a rotary detent arrangement (no visible) such that a central length dimension of plug structure 241A is parallel with a particular pair of dial markings 242, such as the 180-degree markings, the 45-degree markings, or the 90-degree markings. Some embodiments allow for continuous adjustment of the angular rotation of the dial relative the markings. Magnetic plug structure 241A includes a magnetic portion magnetically coupling to power mounting rail 110 as well as a pair of positive and negative terminals configured to electrically couple to the positive and negative conductors or contacts within the mounting track. With setting of the angle of the plug using dial markings 242, the lighting element can be plugged into the power mounting track with the lighting element having the selected angular orientation relative to the power rail. The lighting element can be removed and set to an alternative angle, or be rotated about axis 244 while plugged into the mounting track. Note that some embodiments may omit the magnetic element within dial plug 240, relying solely on an interference fit of the plug and channel slot.

Figure 5:
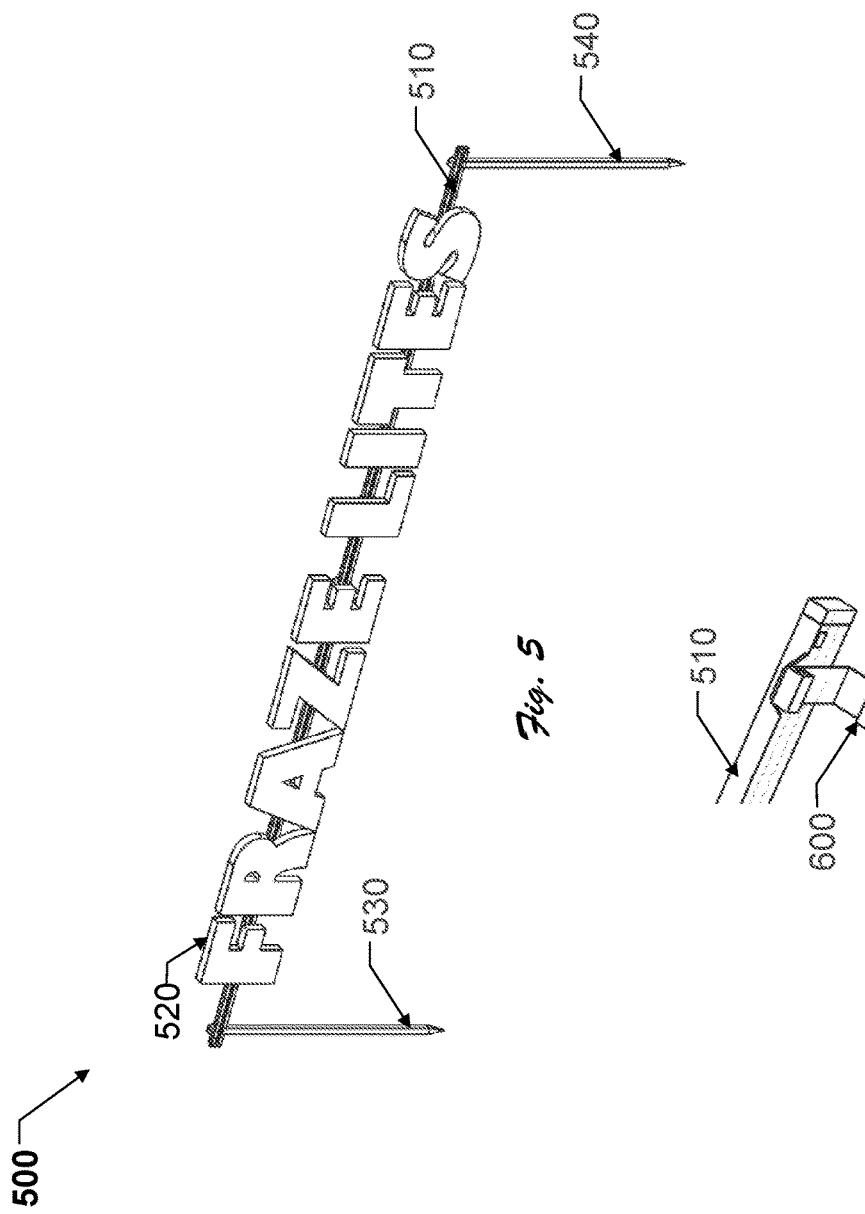
FIG. 5 is a perspective view of a modular alphanumeric signs assembly 500, corresponding to one or more embodiments of the present invention.

FIG. 5 shows an exemplary lighting assembly 500 that is similar in form and function to assembly 100, with some notable exceptions. In particular, assembly 500 is shown without power source and smartphone, and with power mount track 510, alphanumeric lighting elements 520, and ground stakes 530 and 540. Ground stakes 530 and 540 are configured for insertion into the ground and for supporting the power mounting rail and any attached lighting elements above ground. In some embodiments, each of the ground stakes, specifically an upper portion thereof, screws, snaps, or bolts onto one of the mounting tabs on the power mounting rail. In some embodiments, the ground stakes are provided as part of a kit with the power mounting rail, lighting elements, and a power source. In still other embodiments, the kit may also include hooks which attached to the mounting tabs enabling hanging of the power mounting rail and lighting elements from a gutter.

Figure 6:
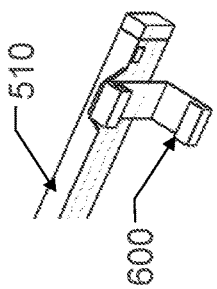
FIG. 6 is a perspective view of an exemplary hook structure attached to an end portion of the FIG. 5 assembly, corresponding to one or more embodiments of the present invention.

FIG. 6 shows an end portion of power mount rail 510 with a gutter hook 600 mounted to it. Hook 600 includes an upper hook portion 600A which is configured to hook over a front edge of a gutter (not shown) and a lower portion 600B which is configured to engage as a stop against the lower portion of a gutter to maintain a generally vertical orientation of the power mounting rail and any attached lighting elements.

Figure 7:
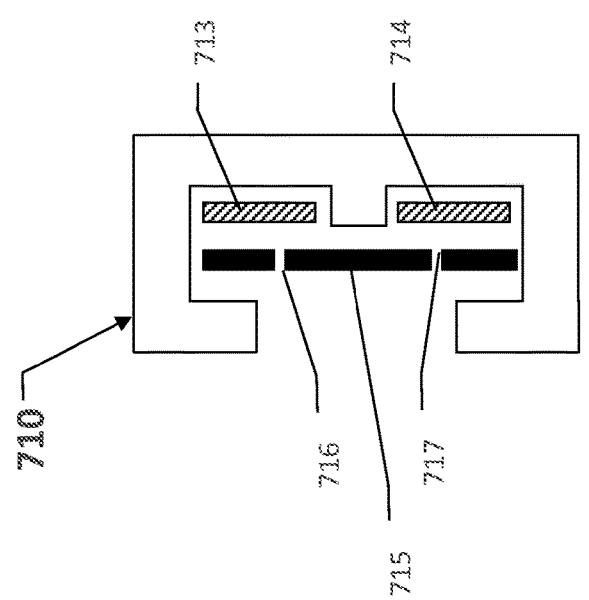
FIG. 7 is a cross-sectional view of power mounting track 710 suitable for use with one or more of the modular sign assemblies described herein, and therefore, corresponding to one or more embodiments of the present invention.

FIG. 7 shows a cross-sectional view of an exemplary channel structure indoor-outdoor power mounting track 710 which may be used in place of one of more of power mounting track described herein. Mounting track 701 includes internal conductors 713 and 714, which are protected from water and dust via a rubber, silicone, or other thermoplastic isolative membrane or sheet 715. Sheet 715 includes slits or slots 716 and 717 which can be penetrated with a contact terminal, for example on the dial plug of one of the lighting elements described herein to establish electrical connection of the circuitry within the elements to a power sources.

Figure 8:
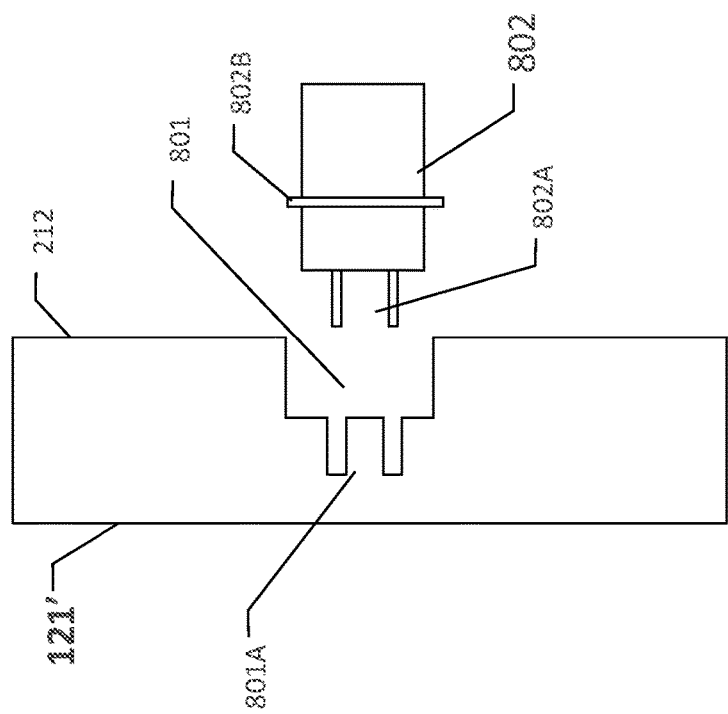
FIG. 8 is a partial sectional view of a modular alphanumeric lighting element suitable for use with one or more of the modular sign assemblies described herein, and therefore, corresponding to one or more embodiments of the present invention.

FIG. 8 shows a partial view of back surface 212 of an alternative version of lighting element 121, labeled 121'. As shown, the back surface includes a recessed female socket structure 801 configured to receive a male plug structure 802 with a pair of contacts 802A that engage with a pair of contact receptacles 801A configured to receive a male contacts 802A which are electrically coupled to power conductors within power mounting track 110. Plug structure 802 also includes a gasket or sealing ring structure 802B around its periphery to engage with the interior of socket structure 801 in a generally water-tight seal, making the connection weather proof.

Figure 9:
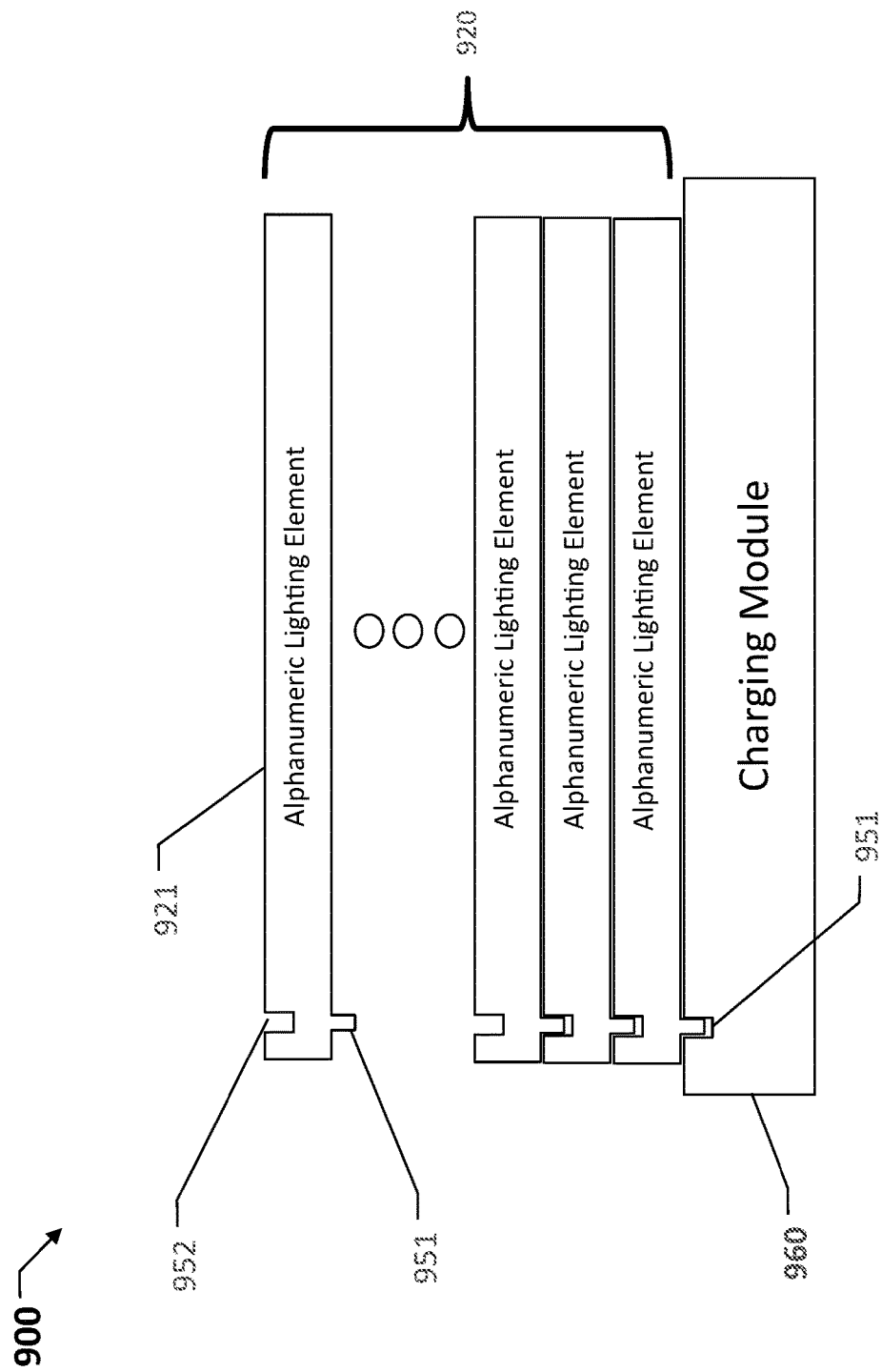
FIG. 9 is a block diagram of a modular sign assembly, corresponding to one or more embodiments of the present invention.

FIG. 9 shows a stackable lighting element assembly 900. Assembly 900 includes a charging module 960 configured to recharge batteries within each of a stacked arrangement of one or more alphanumeric lighting elements 920, similar or identical to lighting elements 120. Each of lighting elements 920, of which element 921 is generally representative includes a pair of male contact points 951 and a pair of female contact points 952, which plug into a corresponding adjacent lighting element in the stacked arrangement. The arrangement of alphanumeric lighting elements, in some embodiments, includes the characters for a fully spelling out a predetermined message such as Happy Birthday or Happy Holidays for example. In some embodiments, inductive coupling or resonant inductive coupling between the adjacent lighting elements in the stack and the charging modules is used to eliminate the need for direct electrical contact between the elements.

CONCLUSION

In the foregoing specification, specific exemplary embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the term "exemplary" is used as an adjective herein to modify one or more nouns, such as embodiment, system, method, device, and is meant to indicate specifically that the noun is provided as a non-limiting example.

The invention claimed is:

1. A signage assembly comprising:
   a power track having first and second power conductors and at least one opening configured for accessing the first and second power conductors; and
   a set of two or more alphanumeric lighting elements, each having a translucent or transparent plastic housing containing a set of two or more electrically coupled LEDs, with each lighting element having a rotary dial plug structure positioned on a back portion of the housing and configured to removably plug into the one opening in the power track and allow rotational adjustment of the housing relative to the dial plug and the power track.

2. The signage assembly of claim 1, wherein each rotary dial plug includes a magnetic member for magnetically retaining the lighting element in contact with the power track.

3. The signage assembly of claim 1, wherein each lighting element includes circuitry configured to receive wireless control signals from a suitably programmed smartphone.

4. The signage assembly of claim 3, further including a smartphone having stored in memory instructions for communicating with and controlling the set of two or more alphanumeric lighting elements.

5. The signage assembly of claim 1:
   wherein each of the alphanumeric lighting elements includes a rechargeable battery;

wherein each of the lighting elements is configured to stack on, mechanically connect to, and electrically couple to a lighting element above it and/or below it; and wherein the assembly further includes a recharge module configured to electrically couple to and recharge the battery in each of the alphanumeric lighting elements when they are in a stacked arrangement.

6. The signage assembly of claim 1, wherein each of the alphanumeric signage elements is configured to resonantly inductively couple to an external power device.

7. The signage assembly of claim 1, wherein the power track includes:
   a channel structure containing the first and second power conductors and having an opening;
   an insulative membrane positioned between the opening and the first and second power conductors; and
   at least one slit in the membrane configured to allow electrical connection of at least one of the lighting elements to at least one of the first and second power conductors.

8. The signage assembly of claim 1, further including at least one hook configured to mount on the power track and allow mounting of the power track to a gutter.

9. The signage assembly of claim 1, further including at least first and second ground stakes configured to removably attach to the power track.

10. A signage assembly comprising:
    a channel structure having a longitudinal opening;
    a set of two or more alphanumeric lighting elements, each having a translucent or transparent plastic housing containing a set of two or more LEDs coupled to a rechargeable battery and a wireless control circuitry configured to receive control signals from a suitably programmed smartphone, with each lighting element having a rotary dial plug structure positioned on a back portion of the housing and configured to removably plug into the longitudinal opening in the channel structure and allow rotational adjustment of the housing relative to the dial plug and the channel structure.

11. The signage assembly of claim 10, wherein each of the LEDs can change color in response to electrical input and wherein the wireless control circuitry is further configured to change color of the LEDs in response to signals from a smartphone having stored in memory instructions for communicating with and controlling the set of two or more alphanumeric lighting elements.

12. The signage assembly of claim 10, wherein each of the alphanumeric lighting elements includes a rechargeable battery; wherein each of the lighting elements is configured to stack on, mechanically connect to, and electrically couple to a lighting element above it and/or below it; and wherein the assembly further includes a recharge module configured to electrically couple to each of the alphanumeric lighting elements in a stacked arrangement.

13. The signage assembly of claim 10, wherein each of the alphanumeric lighting elements is configured to resonantly inductively couple to an external power device which wirelessly powers each of the alphanumeric lighting elements.

14. The signage assembly of claim 10, wherein one of the alphanumeric lighting elements is configured to resonantly inductively couple to an external power device which wirelessly powers each of the alphanumeric lighting elements through the one alphanumeric lighting element.

15. The signage assembly of claim 10, further including at least one hook configured to mount on the power track and allow mounting of the track to a gutter.

16. The signage assembly of claim 10, further including at least first and second ground stakes configured to removably attach to the track.

17. A signage assembly comprising:
    a channel structure having a longitudinal opening;
    a set of two or more alphanumeric lighting elements, each having a translucent or transparent plastic housing containing a set of two or more LEDs coupled to a rechargeable battery and a wireless control circuitry configured to receive control signals from a suitably programmed smartphone, with each lighting element having a rotary dial plug structure positioned on a back portion of the housing and configured to removably plug into the longitudinal opening in the channel structure and allow rotational adjustment of the housing relative to the dial plug and the channel structure; and
    a first resonant inductive power circuit electrically coupled to at least one of the sets of two or more LEDs.

18. The signage assembly of claim 17, wherein each of the LEDs can change color in response to electrical input and wherein the wireless control circuitry is further configured to change color of the LEDs in response to signals from a smartphone having stored in memory instructions for communicating with and controlling the set of two or more alphanumeric lighting elements.

19. The signage assembly of claim 17, further comprising a second resonant inductive power circuit configured to wirelessly transfer power to the first resonant inductive power circuit.

20. The signage assembly of claim 19, wherein the first resonant inductive power circuit includes a rechargeable battery that powers two or more of the alphanumeric lighting elements via conductors within the channel.

21. The signage assembly of claim 19, wherein each of the lighting elements is configured to stack on, mechanically connect to, and electrically couple to a lighting element above it and/or below it; and wherein the assembly further includes a recharge module configured to inductively resonate with the first resonant inductive power circuit and charge each of the alphanumeric lighting elements in a stacked arrangement.

22. The signage assembly of claim 19, wherein first inductive resonant power circuit is positioned within a portion of the channel and electrically coupled to one or more of the alphanumeric lighting elements through one or more conductors in the channel.

23. The signage assembly of claim 17, further including at least one hook configured to mount on the power track and allow mounting of the track to a gutter.

24. The signage assembly of claim 17, further including at least first and second ground stakes configured to removably attach to the track.

* * * * *